(12) United States Patent
Kozlowski et al.

(10) Patent No.: US 6,535,247 B1
(45) Date of Patent: Mar. 18, 2003

(54) ACTIVE PIXEL SENSOR WITH CAPACITORLESS CORRELATED DOUBLE SAMPLING

(75) Inventors: Lester J. Kozlowski, Simi Valley, CA (US); David L. Standley, Westlake Village, CA (US)

(73) Assignee: Pictos Technologies, Inc., Newport Beach, CA (US)

( * ) Notice: Subject to any disclaimer, the term of this patent is extended or adjusted under 35 U.S.C. 154(b) by 0 days.

(21) Appl. No.: 09/081,541

(22) Filed: May 19, 1998

(51) Int. Cl.[7] .............................................. H04N 5/217
(52) U.S. Cl. ...................... 348/241; 348/308
(58) Field of Search ............... 348/241, 302, 348/308; 257/291, 292

(56) References Cited

U.S. PATENT DOCUMENTS

| | | |
|---|---|---|
| 4,249,122 A | 2/1981 | Widlar |
| 4,463,383 A | 7/1984 | Sonoda et al. |
| 4,466,018 A | 8/1984 | Sonoda et al. |
| 4,676,761 A | 6/1987 | Poujois |
| 4,794,247 A | 12/1988 | Stineman, Jr. |
| 5,043,820 A | 8/1991 | Wyles et al. |
| 5,083,016 A | 1/1992 | Wyles et al. |
| 5,122,881 A * | 6/1992 | Nishizawa et al. ......... 348/308 |
| 5,187,583 A * | 2/1993 | Hamasaki .................. 348/250 |
| 5,296,696 A | 3/1994 | Uno |
| 5,345,266 A | 9/1994 | Denyer |
| RE34,908 E | 4/1995 | Wyles et al. |
| 5,471,246 A * | 11/1995 | Nishima et al. ............ 348/311 |
| 5,471,515 A | 11/1995 | Fossum |
| 5,488,415 A * | 1/1996 | Uno ........................... 348/241 |
| 5,541,402 A | 7/1996 | Ackland et al. |
| 5,576,763 A | 11/1996 | Ackland et al. |
| 5,587,596 A | 12/1996 | Chi et al. |
| 5,608,243 A | 3/1997 | Chi et al. |
| 5,877,715 A * | 3/1999 | Gowda et al. ............... 348/294 |

FOREIGN PATENT DOCUMENTS

| | | |
|---|---|---|
| EP | 0 521 255 A2 | 1/1993 |
| GB | 2 317 522 A | 3/1998 |

OTHER PUBLICATIONS

R.H. Dyck and G.P. Weckler; "Integrated arrays of silicon photodetectors for image sensing," IEEE Trans, Electron Devices, ED–15, Apr. 1968, pp. 196–201.

J.D. Plummer and J.D. Meindl, "MOS electronics for a portable reading qid for the blind," IEEE J. Solid–State Circuits, SC–7, Apr. 1972, pp. 111–119.

N. Koike, I. Takemoto, K. Satoh, S. Hanamura, S. Nagahara and M. Kubo, "MOS Area Sensor: Part I—0 Design consideration and performance of an n–p–n Structure 484 x0 384 element color MOS Imager," IEEE Trans. Electron Devices, ED–27 (8), Aug. 1980, pp. 1676–1681.

S. Ohba, M. Nakai, H. Ando, S. Hanamura, S. Shimada, K. Satoh, K. Takahashi, M. Kubo and T. Fujita, "MOS Area Sensor: Part II——0 Low–Noise MOS Area Sensor withi Antiblooming Photodoides," IEEE Trans. Electron Devices, ED–27 (8), Aug. 1980, pp. 1682–1687.

(List continued on next page.)

*Primary Examiner*—Wendy R. Garber
*Assistant Examiner*—Jason Whipkey
(74) *Attorney, Agent, or Firm*—Christopher J. Rourk; Akin Gump Strauss Hauer & Feld, LLP

(57) ABSTRACT

An imager pixel including a photodetector, a first MOS transistor functioning as the driver of a source follower amplifier, a second MOS transistor functioning as a pixel readout transistor, and a third transistor performing a dual function to reset the photodetector during a first time interval and cancel reset noise by serving as a weak current source during a second time interval.

25 Claims, 8 Drawing Sheets

OTHER PUBLICATIONS

EG&G Reticon Sales Catalog, *Image Sensing and Solid State Camera Products 1994/1995*. Solid State Image Sensor Array Specifications for Part Nos.: RA2568N, RA0100A/RA0128N and RA0256B.

H. Ando, S. Ohba, M. Nakai, T. Oxaki, M. Ozawa, K. Ikeda, T. Masuhara, T. Imaide, I. Takemoto, T. Suzuki and T. Fujita, "Design Consideration and Performance of a New MOS Imaging Device," IEEE Trans. On Elec. Dev., ED–32 (8), Aug. 1985, pp. 1484–1489.

N. Tanaka, T. Ohmi and Y. Nakamura, "A Novel Bipolar Imaging Device with Self–Noise–Reduction Capability," IEEE Trans Elec. Dev., 36 (1), Jan. 1989, pp. 31–38.

G.P. Weckler, "Storage Mode Operation of a Phototransistor and its Adaptation to Integrated Arrays for Image Detection," IEDM, Oct. 1966. . ) Abstract only) No known paper available from professional document delivery services.

N. Tanaka, T. Ohmi, Y. Nakamura and S. Matsumoto, "A Low–Noise BI–CMOS Linear Imager Sensor with Auto–Focusing Function," IEEE Trans Elec. Dev., 36 (1), Jan. 1989, pp. 39–45.

N. Tanaka, S. Hashimoto, M. Shinohara, S. Sugawa, N. Morishita, S. Matsumora, Y. Nakamura and T. Ohmi, A 310k Pixel Bipolar Imager (BASIS), ISSCC 1989.

G. P. Weckler, "Charge Storage Lights the Way for Solid-–State Image Sensors," Electronics, May 1, 1967, pp. 75–78.

G. P. Weckler, "Operation of p–n Junction Photodetectors in a Photon Flux Integrated Mode", IEEE Journal of Solid State Circuits, vol. SC–2, No. 3, Sep. 1967, pp. 65–73.

G.P. Weckler and R.H. Dyck, "Integrated Arrays of SI licon Photodetectors for Image Sensing", WESCON, Aug. 22–25, 1967, pp. 1–8.

L.J. Kozlowski, J. Luo, W.E. Kleinhans and T. Liu, "Comparison of Passive and Active Pixel Schemes for CMOS Visible Imagers", SPIE, vol. 3360, Apr. 1998.

Ming–Jer Chin, Yen–Bin Gu, Terry Wu, Po–Chin Hsu, and Tsung–Hann Liu, "Weak Inversion Charge Injection in Analog Mos Switches", IEEE Journal of Solid–State Circuits, vol. 30, No. 5, May 1995, pp. 604–606.

Peter W. Fry, Peter J.W. Noble and Rober J. Rycroft, "Fixed–Pattern Noise in Photomatrices", IEEE Journal of Solid–State Cirucits, vol. SC–5, No. 5, Oct. 1970, pp. 250–254.

Degrauwe et al., "A Micropower CMOS–Instrumentation Amplifier", IEEE Journal of Solid–State Circuits, vol. SC–20, No. 3, Jun. 1985, pp. 805–807.

Letter dated Jul. 31, 1998, from Gene Weckler, Rad–Icon Imaging Corp., addressed to Mark Wettler.

Article by R. Daniel McGrath, Vincent S. Clark, Peter K. Duane, Lisa G. Mciirath, William D. Washkurak, IEEE International Solid State Circuits Conference (Feb., 1997) "Current–Mediated, Current–Reset 768×0 512 Active Pixel Senxoe Array".

* cited by examiner

ACTIVE PIXEL SENSOR WITH CAPACITORLESS CORRELATED DOUBLE SAMPLING

BACKGROUND OF THE INVENTION

1. Field of the Invention

The present invention relates to electronic imaging devices and, in particular, to low-noise MOS-based imagers having minimal analog components in each pixel. The invention provides both a method and apparatus for significantly improving cancellation of reset noise in an MOS active pixel sensor (APS).

2. Description of Related Art

The prior art describes many alternatives to CCD sensors for generating video or still images. The various schemes can be grouped into two basic classes, depending upon whether signal amplification is performed at each pixel or in support circuits. In the passive-pixel sensor, pixel simplicity and optical fill factor are maximized. Active-pixel sensors (APS's) include an amplifier at each pixel site to instead optimize signal transfer and sensitivity.

The simplest passive pixel comprises a photodiode and an access transistor wherein the photo-generated charge is passively trnsferred from each pixel to downstream circuits. The integrated charge must, however, be efficienfly transferred with low noise and low nonuniformity. Since each column of pixels often shares a common row or column bus for reading the signal, noise and nonuniformity suppression are typically facilitated in the "column" buffer servicing each bus. One prior approach shown in FIG. 1, and having capacitor 2, transistors 4, 14, and 16, pixel sensor 8, and assembly 6, used a buffer consisting of a transimpedance amplifier with capacitive feedback to yield reasonable sensitivity considering the large bus capacitance. Since such charge-amplification means were not generally practical for on-chip implementation in early MOS imaging sensors, alternative means compatible with NMOS technology were used. One approach which was mass-produced by Hitachi for camcorders is described in "MOS Area Sensor, etc . . . " Parts I and II" in IEEE Trans. Electron Devices, ED-27 (8), August, 1980, pp. 1676–1687. The key refinements with respect to the approach of FIG. 1 include anti-blooming control and circuitry for reducing fixed pattern noise. Though these imagers were inferior to the emerging charge coupled device (CCD) imagers available at the time, similar MOS imagers are still being offered commercially.

Subsequent efforts at improving passive-pixel imager performance have also focused on column buffer enhancements. One improvement to the column buffer involved using an enhancement/depletion inverter amplifier to provide reasonably large amplification in a small amount of real estate; its 40 1ux (1x) sensitivity was nevertheless nearly an order of magnitude below that of competing CCD-based sensors. Another improvement both enhanced sensitivity and facilitated automatic gain control via charge amplification in the column buffer. Recently, those working in the art have revisited the original capacitive-feedback transimpedance amplifier (CTIA) concept of FIG. 1 because the CTIA appears to the inventors to be nearly ideal for passive-pixel readout if issues with temporal noise pickup and fixed-pattern noise are adequately addressed.

Though much progress has been made in developing passive-pixel imagers, their temporal S/N performance is fundamentally inferior to competing CCD imagers because the bus capacitance translates to read noise of ≈100 e-. CCDs, on the other hand, typically have read noise of 20 to 40 e- at video frame rates. Nevertheless, the allure of producing imagers in conventional MOS fabrication technologies rather than esoteric CCD processes (which usually require many implantation steps and complex interface circuitry in the camera) has encouraged the development of active-pixel sensors that can better compete with CCDs.

It appears to the inventors that the first step in such development is to mitigate the noise associated with the bus capacitance. One approach has been to add amplification to the pixel via the phototransistor by means of a Base-Stored Image Sensor (BASIS) which uses a bipolar transistor in emitter follower configuration together with a downstream correlated double sampler to suppress random and temporal noise. By storing the photogenerated-signal on the phototransistor's base to provide charge amplification, the minimum scene illumination was reportedly reduced to $10^{-3}$ 1x) in a linear sensor array. However, the minimum scene illumination was higher ($10^{-2}$ 1x) in a two-dimensional BASIS imager having 310,000 pixels because the photoresponse nonuniformity was relatively high ($\leq 2\%$). These MOS imagers had adequate sensitivity, but their pixel pitch was too large at about 13 $\mu$m. It has thus appeared desirable to the inventors to shrink the pixel pitch while also reducing photoresponse nonuniformity.

Since the incorporation of bipolar phototransistors is not strictly compatible with mainstream CMOS processes, others have segregated photodetection and signal amplification in an active-pixel sensor essentially comprising a three-transistor pixel with photodiode. All such proposals still offer inadequate performance. One approach discussed in U.S. Pat. No. 5,296,696, for example, augments the basic source-follower configuration with a column buffer that cancels fixed pattern noise, but adds a fourth transistor that creates a floating node vulnerable to generation of random offsets from charge-pumping and concomitant charge redistribution. U.S. Pat. No. 5,043,820 offers a method for injecting charge to reduce offset errors, but not with adequate accuracy and resolution to be useful for competing with CCDs. Furthermore, these and other similar approaches which require 3–4 transistors in the pixel (at least one of which is relatively large to minimize amplifier 1/f noise) in addition to the photodiode, also require off-chip signal processing for best S/N performance because none addresses the dominant source of temporal noise, namely the reset or "KTC" noise.

In order to eliminate or greatly suppress the reset (kTC) noise generated by resetting the detector capacitance, a dedicated memory element is usually needed, either on-chip or off-chip, to store the reset voltage to apply correlated double sampling and coherently subtract the correlated reset noise while the photo-generated voltage is being read. U.S. Pat. No. 5,471,515 subsequently addressed this basic deficiency by developing an APS that uses intra-pixel charge transfer to store the reset charge at each pixel at the start of each imaging frame. This floating gate APS facilitates correlated double sampling with high efficiency by adding several transistors and relying on a photogate for signal detection.

As those skilled in the art will appreciate, in conventional correlated double sampling (CDS) the reset noise is sampled, stored and later subtracted from the composite signal level. Both temporal and spatial noise are reduced since the reset noise is correlated within each frame. CDS, however, requires a storage means for each pixel that resides either on- or off-chip. Adding the memory element to each pixel compromises the pixel optical fill factor or often requires circuit elements not strictly compatible with standard CMOS processes. One alternative—adding the memory cell to the integrated circuit—greatly adds to the chip area and associated fabrication cost. A second alternative—providing the memory in support electronics—requires both full frame memory to store the reset levels on a frame-by-frame basis and signal processing electronics to digitally subtract the stored reset values.

The drawbacks of various prior art approaches are intractable because they increase imager cost. For example, the '515 patent approach adds several transistors to each pixel and several million transistors to each imager thereby reducing production yield. The BASIS apparatus employing bipolar transistors is not compatible with standard CMOS gate fabrication so a nonstandard process must be developed. These deficiencies were subsequently addressed by Ackland U.S. Pat. Nos. 5,576,763 and 5,541,402; and by Chi in U.S. Pat. Nos. 5,587,596 and 5,608,243. Ackland addresses the image lag issues associated with the intra-pixel charge transfer means but still requires a non-standard CMOS process. Chi reduces pixel complexity at the expense of reset noise by instead using the simplest possible active pixel comprising only a phototransistor and reset MOSFET. Chi's implementation incurs reset noise and compromises spectral response at longer wavelengths by putting the photodiode in an n-well.

SUMMARY OF THE INVENTION

A principal object of the invention is to facilitate creation of an improved electronic imaging system;

Another object of the invention is to provide an improved method and apparatus for canceling reset noise in an APS;

Another object of the invention is to facilitate construction of a video camera that can be configured as a single CMOS integrated circuit supported by only an oscillator and a battery.

Additional objects and advantages of the invention will be apparent from the description below and the claims appended hereto.

Important aspects of the present invention are an improved active pixel sensor, as well as a low-noise imaging system employing the improved active pixel sensors for implementation in CMOS or in other semiconductor fabrication technologies. The low-noise amplifier system minimizes the reset or so-called "kTC" noise via an active pixel sensor (APS) arrangement capable of high optical collection efficiency. The system's low noise and high responsivity significantly increase the maximum attainable on-chip signal-to-noise ratio relative to the current state-of-the-art. Many current systems require either expensive off-chip memory and signal processing or APS technology that is not manufacturable using standard CMOS processes. The invention exploits a simple pixel comprising a photodetector and three transistors in conjunction with on-chip signal processing to eliminate the pixel-to-pixel voltage noise which otherwise occurs. The invention thus eliminates the need for conventional correlated double sampling (CDS).

The three transistor APS of the present invention comprises a first transistor which functions as the driver of a source follower amplifier during signal readout, and a second transistor which facilitates signal readout. The third transistor successively serves dual roles as a reset switch and as a weak current source. The weak current source serves to null or cancel the reset noise. The second transistor is appropriately selected by on-chip digital logic to read the signal from each pixel, multiplex the signal outputs from an array of pixels, and enable completion of a feedback loop employed in nulling the reset noise. In the typical two-dimensional array, the multiplexing is performed, as in the prior art, by horizontal and vertical shift registers. Just after all the active pixels in a row (in a one- or two-dimensional imaging array) are reset, each column buffer is used in an independent feedback loop to cancel each pixel's reset noise by biasing the first transistor as a current source and thereby provide the necessary number of minority carriers to cancel the reset noise.

For a visible imager APS design, one additional bus may be needed in the pixel array as compared to the most basic three-transistor APS design. Compared to most practical three-transistor APS', no additional buses are needed.

The present invention also has the heretofore unachieved advantage of eliminating feedthrough-induced offsets stemming from charge pumping.

The dual-purpose third transistor enables detector reset after the integrated signal has been read. While the reset process normally generates a time-varying reset level because the detector capacitance is reset through the switch's finite impedance, according to the invention, the offset charge at the integrating node is perturbed with a weak current source shortly after reset. The weak current source is facilitated by appropriately biasing the "reset" (third) transistor via its gate voltage. Applying feedback via the column buffer suppresses reset noise without having to implement correlated double sampling using either on-chip or off-chip memory.

The low noise amplifier system of the present invention is formed by the aggregate circuitry in each pixel, and the waveform generation circuits and column buffers servicing that column or row of pixels. The signals from the active pixels are read out by the low-noise signal amplification system consisting of the active-pixel, the waveform generators and the column buffer. In addition to providing the means for suppressing the detector's reset noise, the column buffer in the downstream electronics also may perform the usual functions, some of which are optional, including sample-and-hold, video pipelining, and column amplifier offset cancellation to suppress the temporal and spatial noise that would otherwise be generated by the column buffer.

The low-noise system provides the following key functions: (1) reset noise suppression without requiring separate analog memory and signal subtraction for each pixel to facilitate correlated double sampling; (2) high sensitivity via source follower amplification; (3) adequate power supply rejection to enable development of cameras-on-a-chip that do not require elaborate support electronics; (4) compatibility with application to imaging arrays having pixel pitch ≦5 microns when using 0.25 μm lithography; and (5) high optical fill factors using lower cost 0.5 μm lithography.

The invention has the further advantage of full process compatibility with standard silicided submicron CMOS, helps to maximize yield and minimize die cost because the circuit complexity is distributed amongst the active-pixels and peripheral circuits, and exploits the signal processing capability inherent to CMOS. The invention's spectral response is broad from the near-ultraviolet (400 nm) to the near-IR (>800 nm). Because the low-noise system of the present invention has only three transistors in each pixel, the invention offers as-drawn optical fill factor >25% at 7 μm pixel pitch using 0.5 μm design rules in the single-poly, three-metal CMOS available from many foundries. The actual optical fill factor is somewhat larger due to lateral collection and the large diffusion length of commercial CMOS processes. A final advantage is the flexibility to collocate digital logic and signal-processing circuits due its high immunity to electromagnetic interference.

When fully implemented in the desired camera-on-a-chip architecture, the low-noise APS can provide temporal read noise <10 e- (at data rates compatible with either video imaging or still photography via electronic means), fixed pattern noise below 0.01% of the maximum signal (on a par with competing CCD imagers), <0.5% nonlinearity, ~1V signal swing for 3.3V power supply, large charge-handling capacity, and variable sensitivity using simple serial interface updated on a frame-by-frame basis via digital interface to a host microprocessor.

As noted above, a principal object of the invention is an improved electronic imaging system. A key feature of the invention is an integrated low-noise amplifier that reduces cost and power consumption while providing high optical fill factor in mature CMOS processes, low temporal noise and low fixed pattern noise.

BRIEF DESCRIPTION OF THE DRAWINGS

The just described invention, as well as its objects and advantages, will become readily apparent upon reference to the following detailed description when considered in conjunction with the accompanying drawings, in which like reference numerals designate like parts throughout the Figures thereof, and wherein.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art.

Visible imaging systems implemented in CMOS have the potential for significant reductions in cost and power requirements in components such as image sensors, drive electronics, and output signal conditioning electronics. An objective is a video camera that can be configured as a single CMOS integrated circuit supported by only an oscillator and a battery. Such a CMOS imaging system requires lower voltages and dissipates much less power than a CCD-based system. These improvements translate into smaller camera size, longer battery life, and applicability to many new products.

Because of the advantages offered by CMOS visible imagers, there have been ongoing efforts to develop active-pixel sensor (APS) devices. Active-pixel sensors can provide low read noise comparable or superior to scientific grade CCD systems. The active circuit in each pixel of an APS device, however, utilizes cell "real estate" that could otherwise be used to enable imagers having optical format compatible with standard lenses and/or to maximize the sensor optical fill factor for high sensitivity. Active-pixel circuits also may increase power dissipation relative to passive-pixel alternatives, increase fixed pattern noise (possibly requiring additional circuitry to suppress the noise), and limit the scalability of the technology.

The readout and amplification system of the present invention is directly applicable to a practical design for an active-pixel array. A representative embodiment of our low-noise APS invention is configurable in a CMOS embodiment, for example, as a visible imager comprising an array of 1032 (columns) by 776 (rows) of visible light detectors (photodetectors). Using standard 0.5 $\mu$m CMOS design rules, the rows and columns of pixel can be spaced at 7 microns center-to-center to achieve an as-drawn optical fill factor of 25%. Other conceptual computer-aided design (CAD) layouts using 0.25 $\mu$m rules imply that the scheme provides similar fill factor at a highly desirable pitch of 5 to 5.6 $\mu$m. Several columns and rows of detectors at the perimeter of the light-sensitive region can be covered with metal to establish the dark level for various signal processing functions including automatic gain control. In addition, the detectors in each row may be covered with color filters to produce color imagers. For example, the odd rows may begin at the left with red, green, then blue filters, and the even rows may begin with blue, red, then green filters, with these patterns repeating to fill the respective rows.

Figure 1:
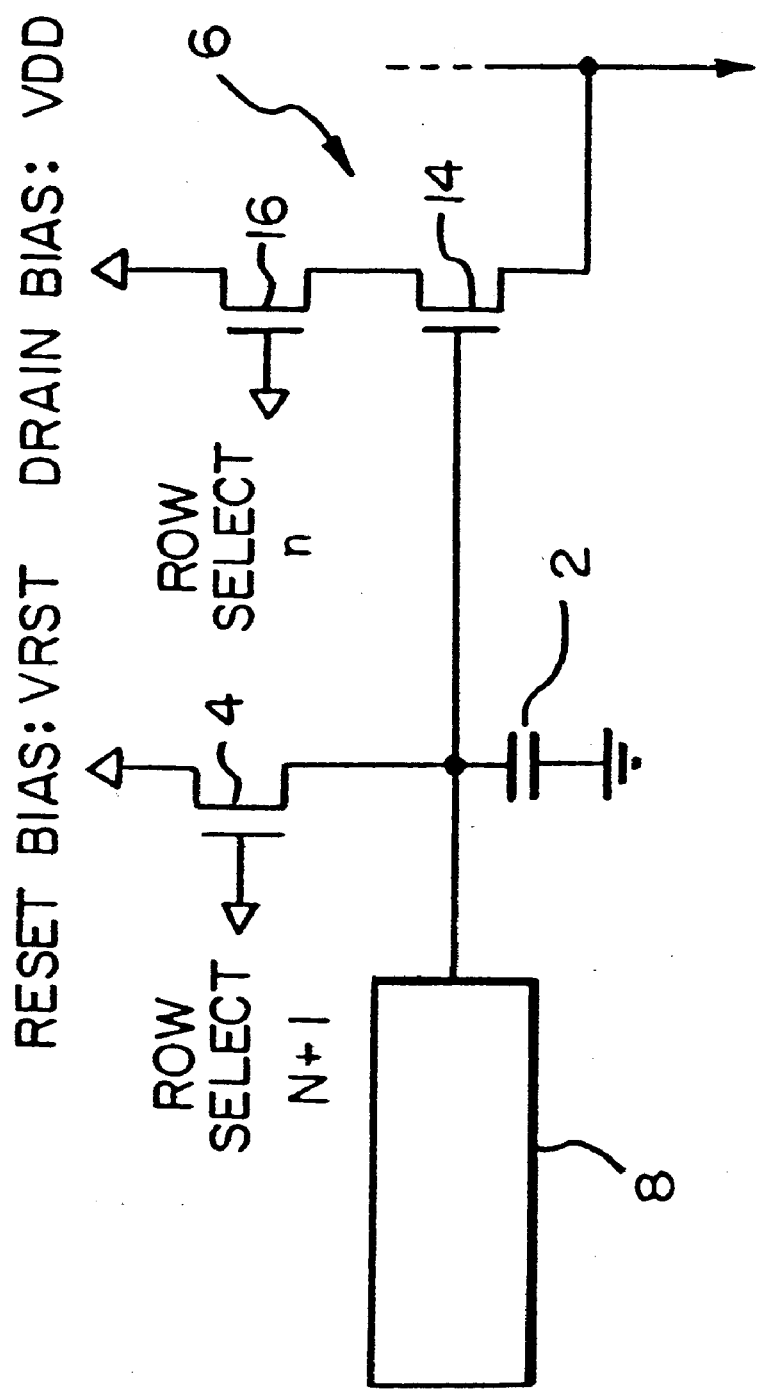
FIG. 1 is a schematic circuit diagram illustrating an amplifier system for active-pixel imaging sensors of the prior art.
Figure 2:
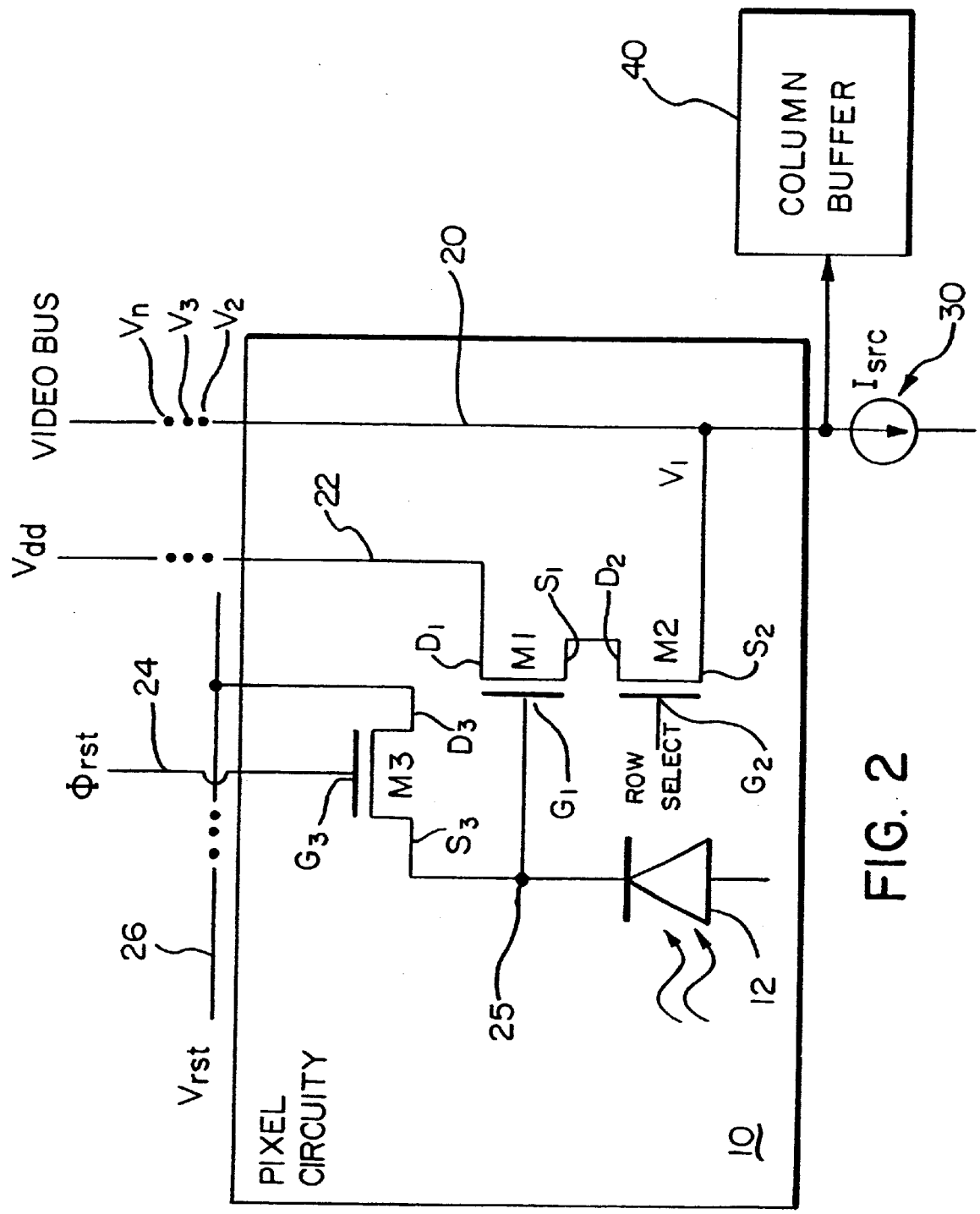
FIG. 2 is a schematic circuit diagram illustrating a low-noise active-pixel according to the preferred embodiment.

A low-noise active-pixel sensor 10 according to the preferred embodiment is illustrated in FIG. 2. In the preferred embodiment, each pixel 10 of the sensor array comprises a photodetector such as a photodiode 12, a driver MOSFET M1, a row select MOSFET M2, having gate G2, source S2, and drain D2, and a dual purpose MOSFET M3, further having source S3 (facilitates both pixel reset and offset cancellation). A video bus 20 connects all the pixel outputs $V_1 \ldots V_n$ in a column of The photodetector array to a common current source 30 and to a column buffer 40. A column bus 22 connects the drain $D_1$ of each MOSFET M1 of each pixel in a column to the power supply voltage $V_{dd}$. A column bus 24 connects the gate G3 of each MOSFET M3 of each pixel in a column, to the reset waveform supply $\Phi_{rst}$. A row bus 26 connects the drain $D_3$ of each MOSFET M3 of each pixel in a row, to the row reset supply voltage $V_{rst}$. The voltage $V_{rst}$ is set to about 2.5V during the time each specific row of the array is being processed and is otherwise held at ground when other rows are successively read out, reset and their reset noise adaptively canceled.

Each transistor M1, M2, M3, may be referred to as having three legs. For an MOS transistor, these legs correspond respectively to its source, gate and drain sides. Each transistor may be further referenced as having a control leg, which would correspond, for example, to the gate terminal of an MOS transistor or the base of a bipolar transistor.

The photodiode 12 may comprise a substrate diode, for example, with the silicide cleared. In such an embodiment, which is preferred for compatibility with most CMOS processes, it is necessary to clear the silicide because it is opaque to visible light. Those skilled in the art will appreciate that the pixel 10 is preferably designed in the simplest form to obtain the largest available light detecting area while providing broad spectral response, control of blooming and signal integration time, and compatibility with CMOS production processes.

For maximum compatibility with standard submicron CMOS processes, the photodiode 12 may be formed at the same time as the lightly doped drain (LDD) implant of n-type MOSFETs for the chosen process; this creates an n-on-p photodiode junction in the p-type substrate. Since no additional ion implantation is necessary, the process and wafer cost for the active-pixel circuit 10 are the same as those of standard, high volume digital electronic products.

Figure 3:
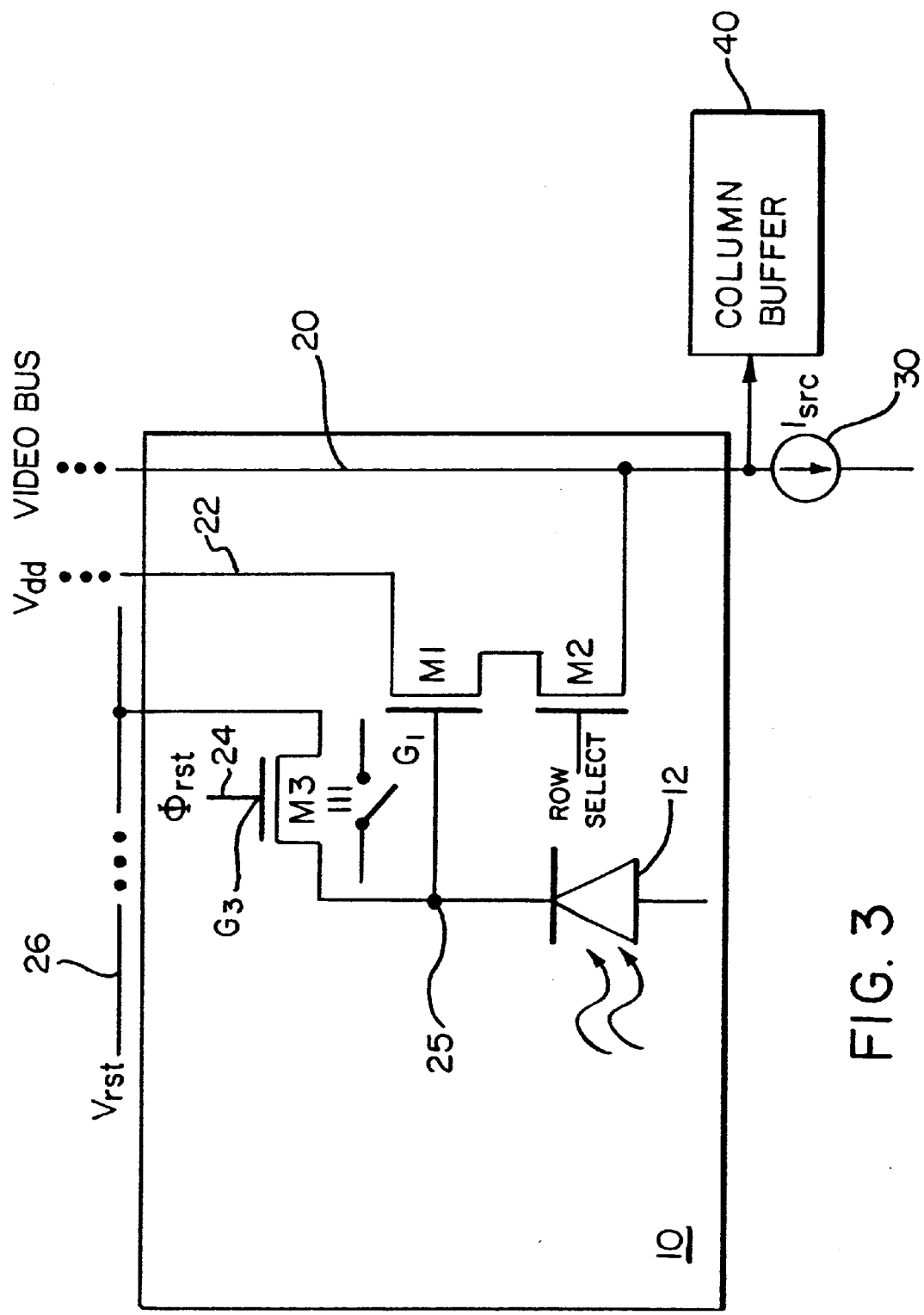
FIG. 3 is a schematic circuit diagram illustrating the low-noise active-pixel of the preferred embodiment during signal readout.

FIG. 3 shows the active pixel sensor configured in readout mode. The signals from the photodetectors 12 are read out after a prescribed integration time, one row at a time, from bottom to top of the array. During signal integration for n-on-p photodetector polarity, the photodiode node 25 driving the gate G1 of source follower M1 discharges from the reset voltage, $V_{rst}$, to a lower voltage. The discharge rate depends directly upon the incident signal. Within each row, the photodetectors 12 are read out from left to right. In preparation for reading and resetting each row, the reset voltage $V_{rst}$ is set to about 2.5V. The upper leg of the MOSFET M1 is connected via the row bus 22 to the low-impedance voltage source $V_{dd}$. Readout then starts by turning on the access MOSFETs M2 of all the photodetectors 12 in a selected row. The lower leg or source $S_1$ of MOSFET M1 thereby connects to a current source $I_{SRC}$ servicing each column via the bus 20. As indicated, the MOSFET M1 is a source follower driver that efficiently transfers the photo-induced signal voltage from each row-selected photodiode 12 to the column bus 20. The transimpedance of the source follower amplifier Ml is inversely proportional to the total capacitance at the gate $G_1$ of the MOSFET M1 including the detector capacitance and various strays.

Figure 4:
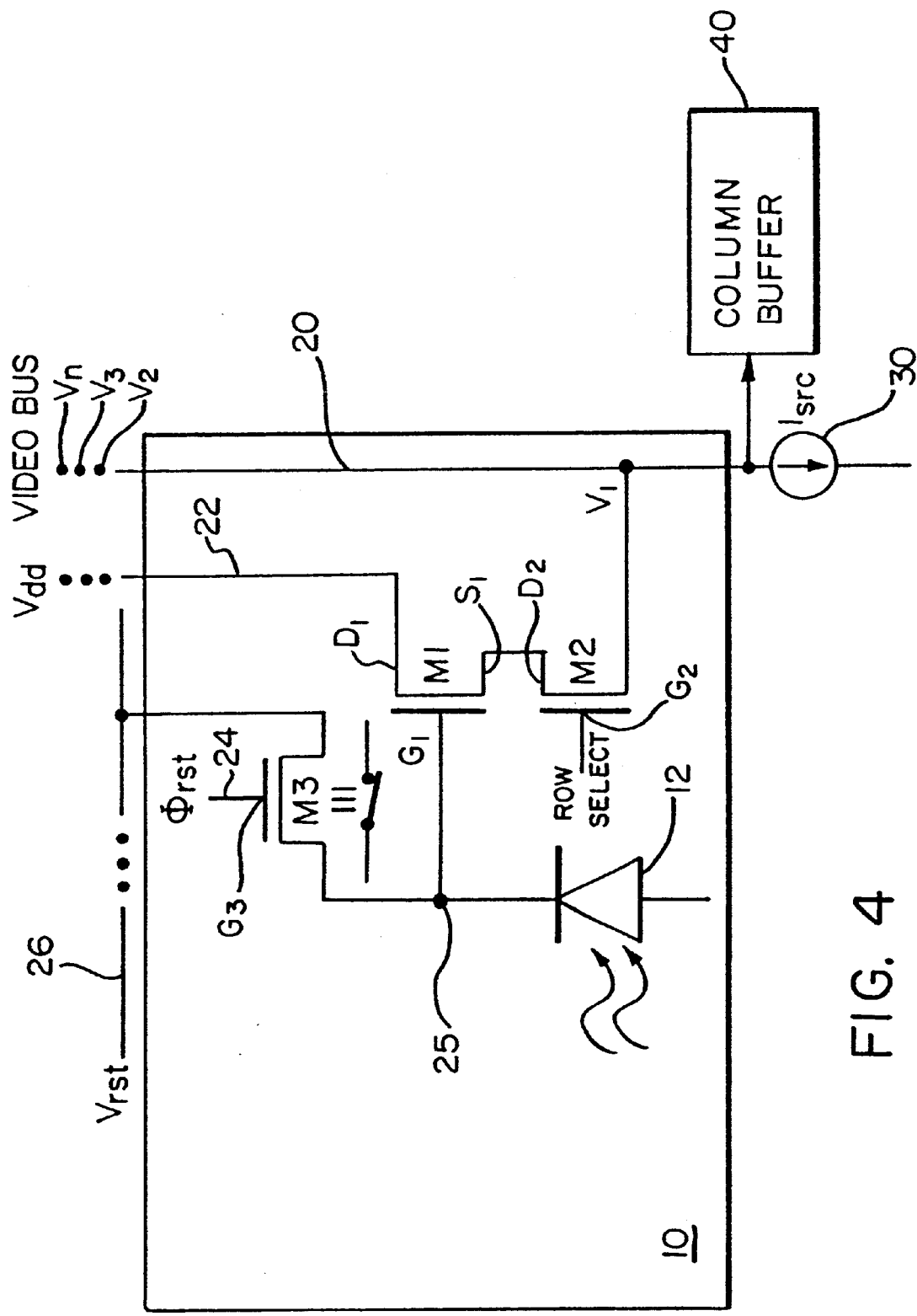
FIG. 4 is a schematic circuit diagram illustrating the low-noise active-pixel of the preferred embodiment during pixel reset.

FIG. 4 illustrates active-pixel operation during pixel reset. The photodetectors 12 are reset one row at a time, from bottom to top of the array. Within each row, the photodetectors 12 are reset from left to right. Reset starts by fully enabling the reset MOSFETs M3 in the selected row, thereby connecting the low-impedance voltage source $V_{rst}$ to photodiode 12. The reset MOSFET M3 is fully enabled by setting the voltage at its gate $G_3$ to 3.3V via the $\Phi_{rst}$ clock waveform (FIG. 7).

Figure 5:
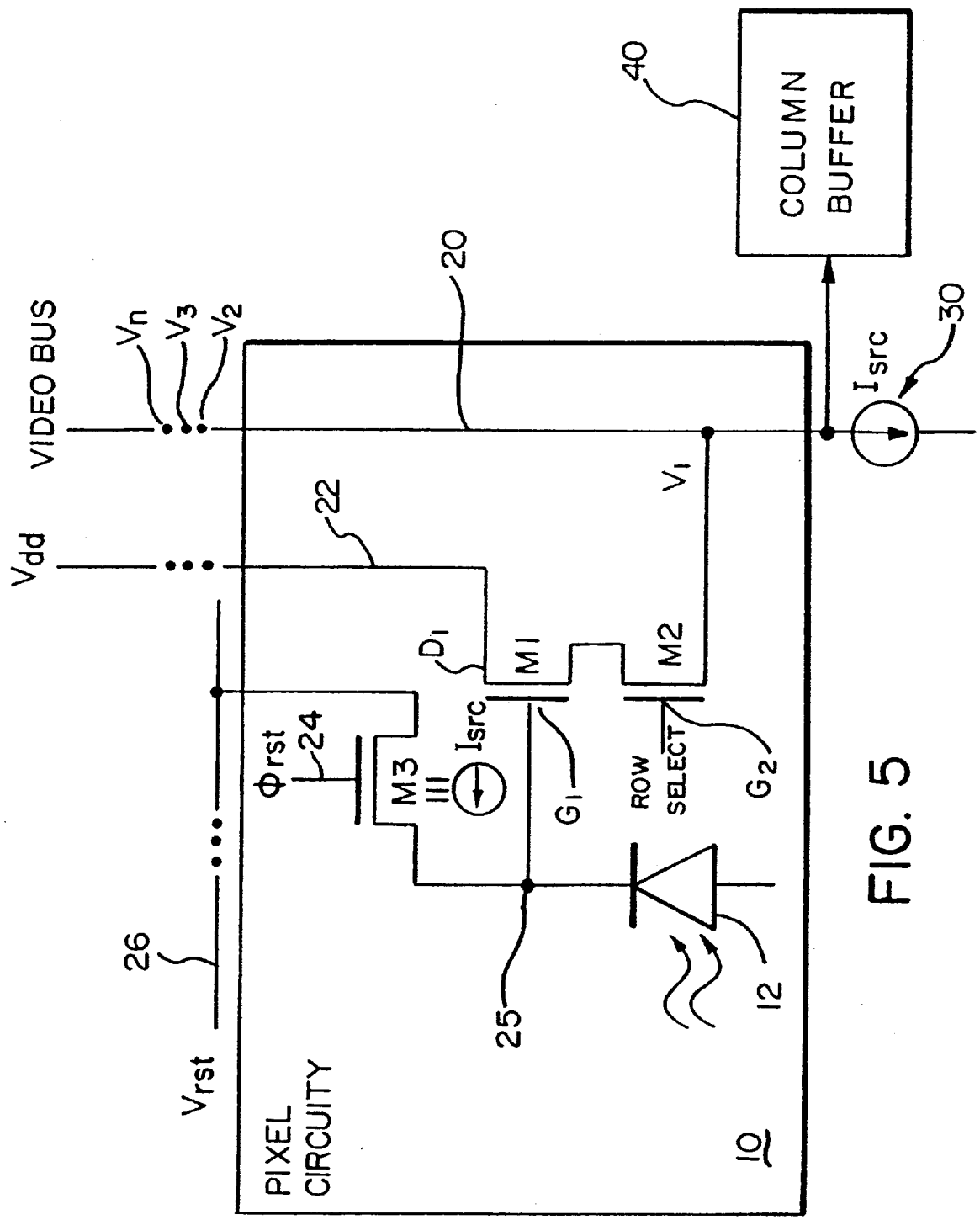
FIG. 5 is a schematic circuit diagram illustrating the low-noise active-pixel of the preferred embodiment during reset noise cancellation.

FIG. 5 shows active-pixel operation during offset suppression. The reset voltage, $\Phi_{rst}$, is set at just below threshold to establish a weak current source (MOSFET M3). The minority carriers (holes) supplied or consumed by MOSFET M3 are used to null the reset noise. The nulling is performed on each pixel 10 in the selected row by comparing the output signals at each column buffer 40 to a reference voltage and turning the current source off once the prescribed level has been reached. Since each pixel 10 has a different offset and each pixel's offset varies from frame to frame, the nulling is performed accordingly.

Figure 6:
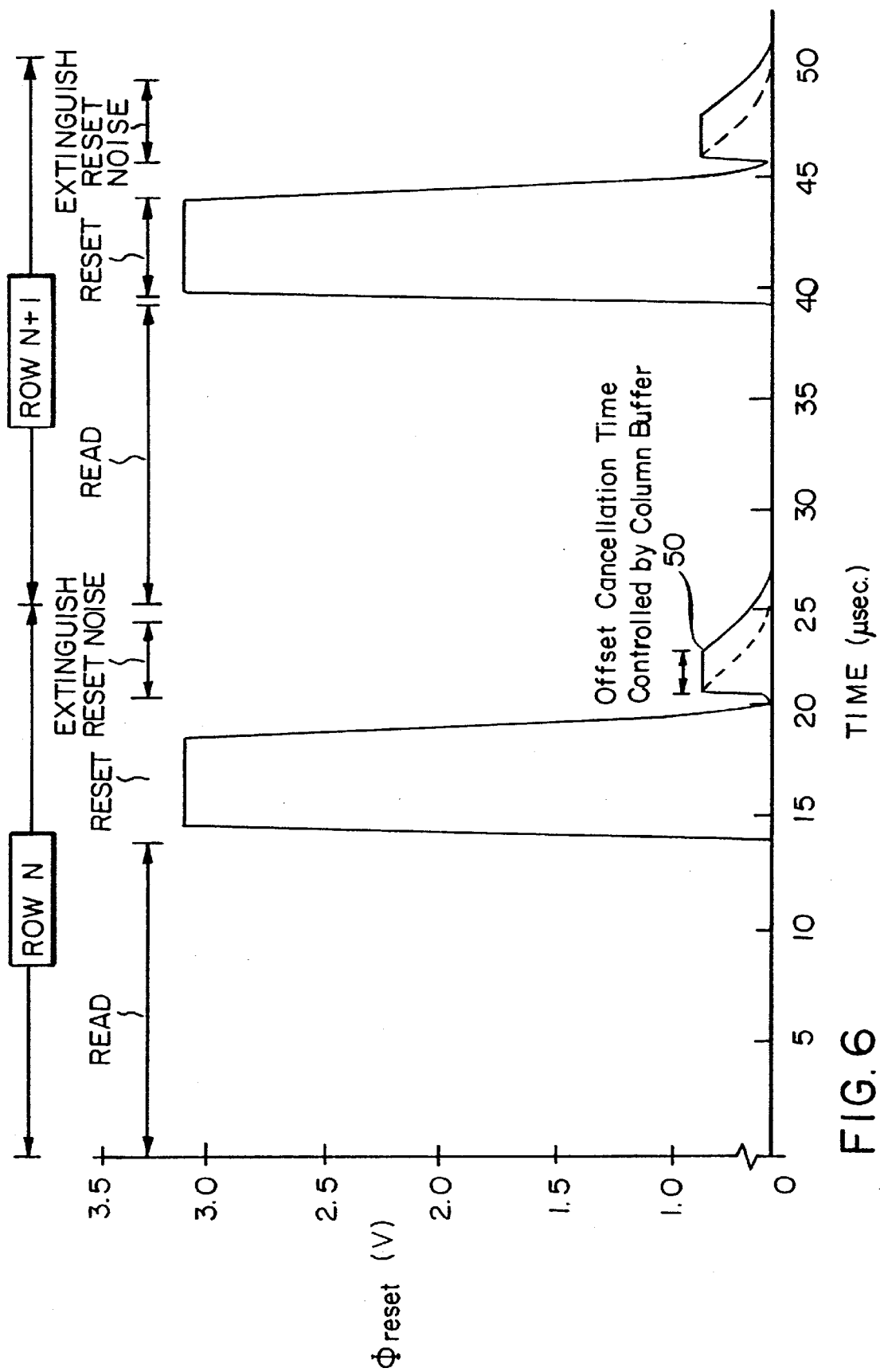
FIG. 6 shows a representative clocking diagram for the reset clock ($\Phi_{rst}$) waveform.

FIG. 6 shows a representative $\Phi_{rst}$ clocking waveform to successively read the pixel 10, reset the pixel 10 and extinguish the pixel's reset noise. According to FIG. 6, the reset voltage $\Phi_{rst}$ is at ground for about 14 μm during which pixel readout occurs. After that point in time, the reset voltage ($\Phi_{rst}$ rises immediately to 3.3 volts to create a reset voltage pulse for a duration of about 5 μm sec. At the end of this 5 μm sec period, the reset voltage drops immediately to ground potential, which is reached at about the 20 μm sec point on the horizontal (Time) axis. Offset cancellation is then effected by bringing the reset voltage $\Phi_{rst}$ back up to 0.6 volts at approximately the 21 μm sec point and holding $\Phi_{rst}$ at that level for a period of time determined by operation of the feedback loop of FIG. 7. The $\Phi_{rst}$ voltage is then returned or ramped from point 50 to ground over a period of about 5 μm sec or longer to minimize charge injection errors. See Chen et al, *Journal of Solid State Circuits*, Vol. 30, No. 5, May, 1995. The read/reset/offset-cancel cycle is then repeated. While the value of the $\Phi_{rst}$ voltage used for offset cancellation will depend on the threshold voltage of transistor M3 for the selected process, the intent is to establish subthreshold operation of transistor M3 as a weak current source.

Figure 7:
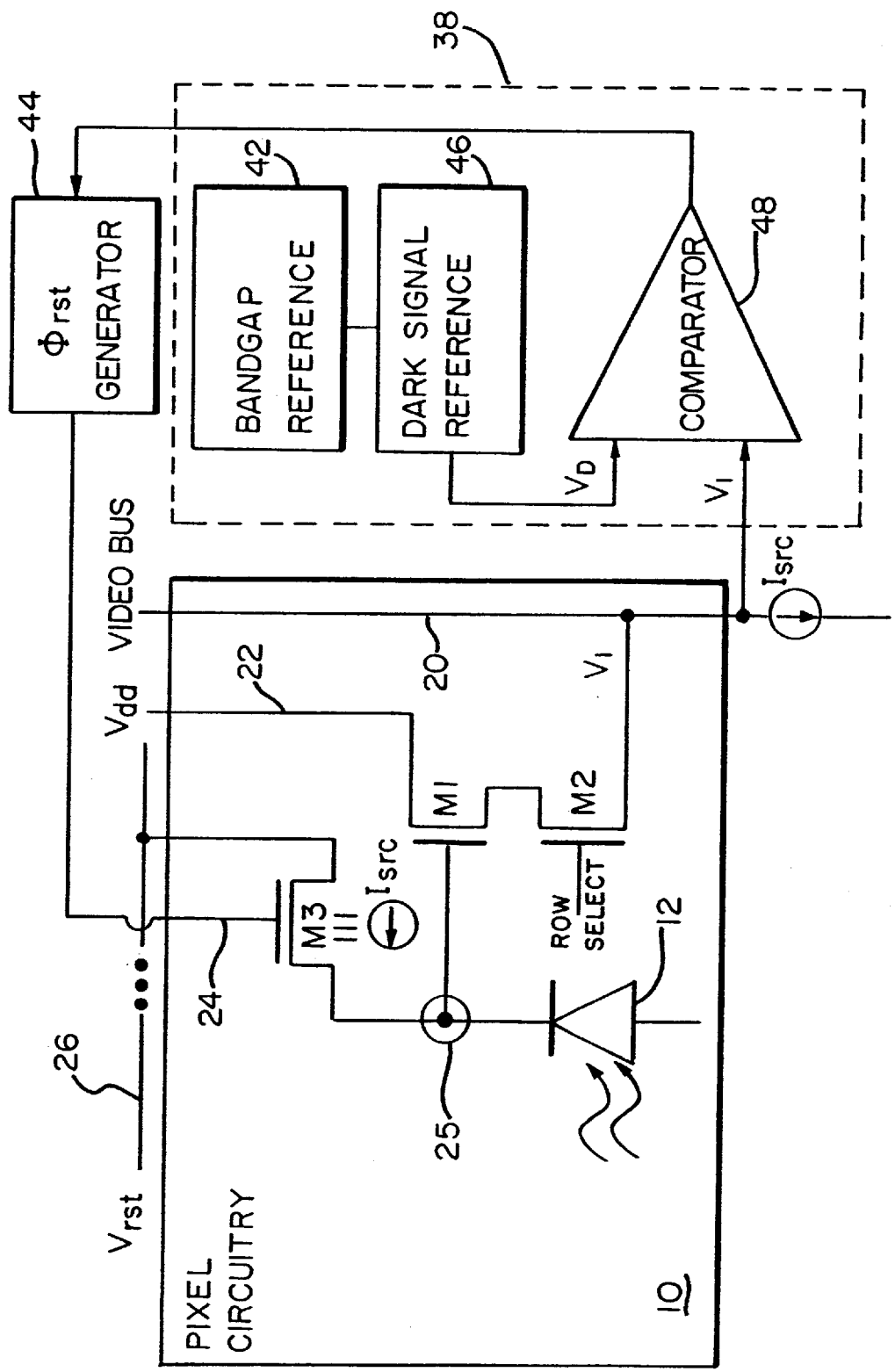
FIG. 7 is a representative circuit diagram illustrating a feedback loop comprised of the active pixel, the column buffer circuit, comparator and reset clock ($\Phi_{rst}$) waveform generator.

FIG. 7 shows a representative embodiment for a feedback loop for the active-pixel 10 including (a) the relevant portion 38 of the column buffer 40 necessary to read the signal $V_1$ and compare it to a reference dark voltage $V_D$ generated from a bandgap reference voltage generator 42, and (b) the reset clock waveform generator 44. As shown in FIG. 6, after the pixel 10 has been reset, the reset clock voltage $\Phi_{rst}$ is returned to ground and then raised back to about 0.6V in order to establish a weak current source to charge and equilibrate the photodetector node 25. The pixel signal $V_1$ is subsequently monitored and compared by a comparator 48 to the reference voltage $V_D$ provided by a dark signal reference source 46. This reference voltage $V_D$ is about 100 mV "darker" than the typical pixel output in the absence of a photogenerated signal. Once each pixel reaches the prescribed dark reference level, which will now be uniform across the row, the reset clock $\Phi_{rst}$ is ramped to ground (beginning at point 50 of FIG. 6) to disable the weak current source provided by the MOSFET M3.

The dark reference voltage $V_D$ may be derived from a bandgap reference using the base-emitter voltage of bipolar transistors. Such circuitry is well known in the prior art, see U.S. Pat. No. 4,249,122, and supported by many CMOS processes.

Figure 8:
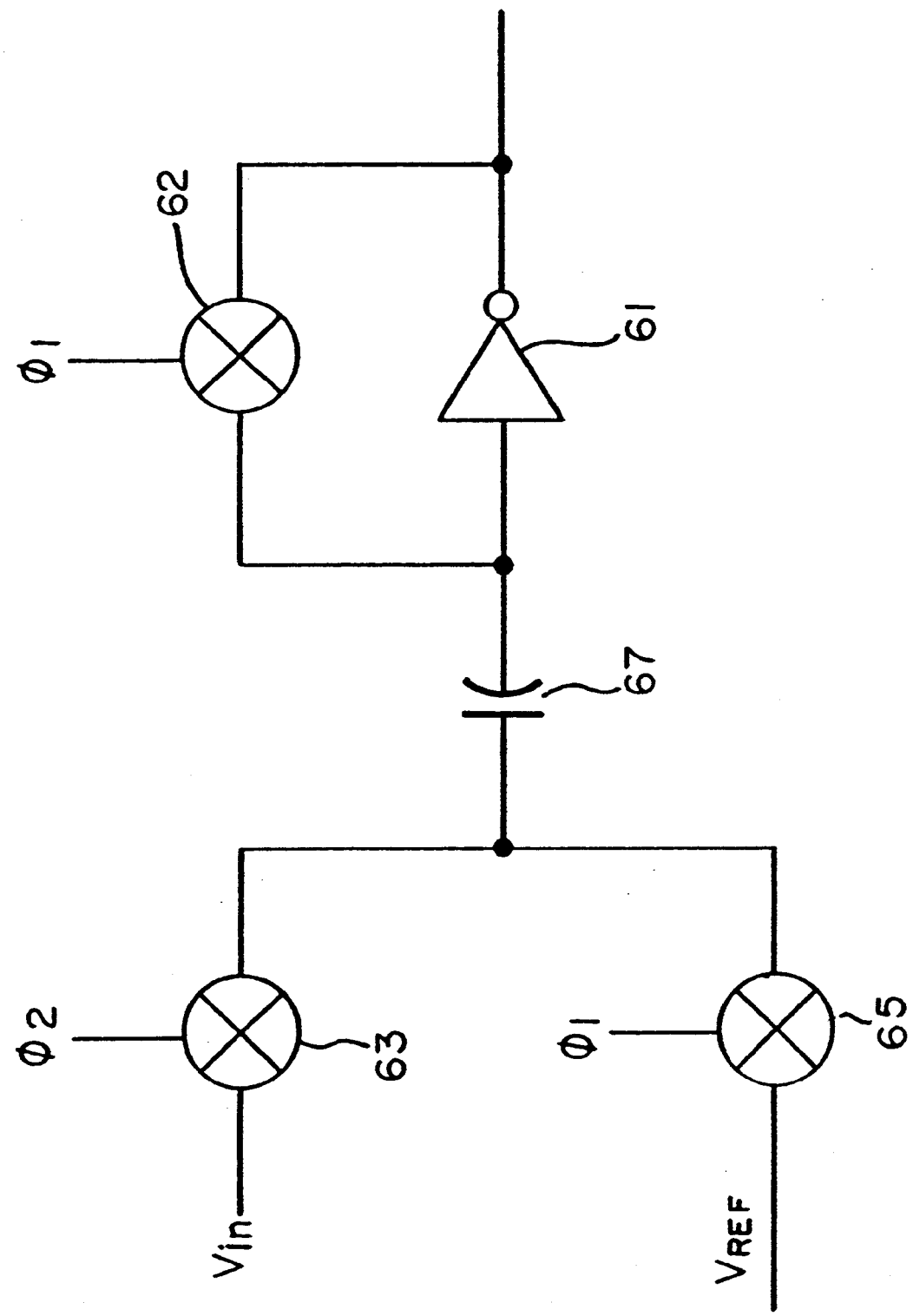
FIG. 8 is a circuit diagram of one embodiment for the comparator shown in FIG. 7.

Figure 8 shows an example of a switched-capacitor CMOS comparator suitable for implementing comparator 48. The comparator shown in FIG. 8 includes an inverting amplifier 61, a first analog sitch 62 in the feedback path of the inverter 61, second and third analog switches 63, receiving input voltage $V_n$ and having phase $\Phi_2$, and 65, receiving input voltage $V_{REF}$ and having phase $\Phi_I$ to alternately sample the pixel signal after reset and the referece voltage level, and a coupling capacitor 67. The first switch 62 enables feedback to bias the compartor and perform autozeroing. Autozeroing allows each comparator in the parallel array of a column buffers to be set to its own unique bias point. As long as this point is maintained within the high-gain region of the inverting amplifier 61, accuracy is not affected and each comparator trips at the appropriate point to null the reset noise with mininum error. The autozeroing also makes the nulling process insensitive to variations in operating temperature and device mismatch.

The first switch 62 is enabled to force the inverting amplifer 61 to its highest gain state. The input capacitor 67 holds this bias point on the input after the first switch 62 is disabled and active feedback is removed. During this autozeroing period when the bias voltage is stored on the summing node side of the capacitor 67, the second analog switch 63 simultaneously charges the other capacitor terminal to the dark reference voltage. The pixel output voltage after reset is subsequently sampled onto the capacitor while the inverter 61 acts as an open loop amplifier. Each comparator circuit hence amplifies the difference signal. By providing open-loop gain >10,000, accuracy to greater than 200 μV is provided and the comparator swings from one of the supply rails to the other when the pixel signal is nulled to the reference level. The resulting logic 1 level at the comparator output subsequently trips the logic generating the $\Phi_{rst}$ waveform to end the nulling process.

The just described operation reduces the fixed-pattern offsets from the source follower MOSFET M1 in each pixel 10 because each photodetector 12 is independently charged to a prescribed voltage using a uniformly generated source of holes with uniform time constant to cancel all pixel-to-pixel variations including those induced by prior charge pumping. By using a weak current source, few additional offset carriers are generated via the process of current source shutdown. In practice, the capacitance at the photodetector node 25 is thus used to store the offset voltage rather than another storage means. Since the state of the art generally uses a dedicated capacitor to perform this function, we refer to this invention as "capacitorless double sampling."

The just described operation is further optimized for conventional CMOS n-well-type processes, but can be employed with p-well processes also wherein polarities are inverted from those of an n-well circuit and the minority carriers supplied by the weak current source for canceling the reset noise are of the appropriate polarity.

In the preferred embodiment, the column bus 20 is monitored by a standard column buffer 40 to read the video signal when it is available. The other key requirements on the column buffer 40 are similar to conventional designs having to handle voltage-mode signals and are familiar to those skilled in the art.

In an implementation of the preferred embodiment, the various clocks for circuits 10, 30 and 40, which together facilitate active-pixel reset, readout and offset noise elimination, are generated on-chip using standard CMOS digital logic and both column and row clocks. The digital logic thus enables "windowing", wherein a user can read out the imager in various formats simply by enabling the appropriate support logic to clock the appropriate subformat. With windowing, a 1032×776 format can be read out as one or more arbitrarily sized and positioned M×N arrays without having to read out the entire array. For example, a user might desire to change a computer-compatible "VGA" format (i.e., approximately 640×480) to either Common Interface Format (CIF; nominally 352×240) or Quarter Common Interface Format (QCIF; nominally 176×120) without having to read out all the pixels in the entire array. This feature simplifies support electronics to reduce cost and match the needs of the particular communication medium. As an example, a personal teleconference link to a remote user having only QCIF capability could be optimized to provide QCIF resolution and thus reduce bandwidth requirements throughout the teleconference link while also reducing the imager power dissipation. As a further example, an imager configured in Common Interface Format (CIF) could provide full-CIF images while supplying windowed information for the portions of the image having the highest interest for signal processing and data compression. During teleconferencing the window around a person's mouth (for example) could be supplied more frequently than the entire CIF image. This scheme would reduce bandwidth requirements throughout the conference link.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An apparatus comprising:
   a pixel comprising:
   (a) a photodetector element having a node;
   (b) a first transistor having a control leg connected to said node and second and third legs, the third leg being connected to a power supply voltage;
   (c) a second transistor having a control leg and fourth and fifth legs, the fourth leg connected to the second leg of said first transistor;
   (d) a third transistor having a control leg and sixth and seventh legs, the seventh leg being connected to a reset voltage source; and
   a feedback loop including a waveform generator for supplying a reset voltage waveform to the control leg of said third transistor to reset said photodetector, said reset voltage waveform comprising a ground voltage level followed by a first reset voltage pulse for resetting the photodetector followed by an offset cancellation voltage pulse of a duration selected to cancel reset noise generated by resetting said photodetector.

2. The apparatus of claim 1 wherein said feedback loop further comprises:
   a comparator circuit connected to compare the voltage on the fifth leg of said second transistor to a dark signal reference voltage.

3. The apparatus of claim 2 wherein each of said first, second and third transistors comprises a MOSFET.

4. The apparatus of claim 3 wherein each said MOSFET is fabricated in CMOS.

5. The apparatus of claim 4 wherein said photodetector comprises a substrate diode with a silicide portion thereof removed.

6. The apparatus of claim 4 wherein said photodetector comprises an n on p photodiode junction in a p-type substrate.

7. In an active pixel circuit including a photodetector, a source follower driver MOS transistor, a row select MOS transistor and a reset MOS transistor, the method comprising:
   reading out the voltage on the photodetector;
   resetting the photodetector; and
   canceling reset noise created by resetting the photodetector by causing said reset MOS transistor to act as a current source.

8. The method of claim 7 wherein the step of reading out the voltage on the photodetector includes the step of holding off the reset MOS transistor and turning on the row select MOS transistor.

9. The method of claim 8 wherein said step of resetting the photodetector comprises the step of fully enabling said reset MOS transistor.

10. The method of claim 7 wherein said step of canceling said reset noise comprises the step of applying a selected voltage level to a gate of said reset MOS transistor.

11. The method of claim 9 wherein said step of canceling said reset noise comprises the step of applying a selected voltage level to a gate of said reset MOS transistor.

12. The method of claim 10 wherein said voltage level is selected to provide subthreshold biasing of said reset transistor.

13. The method of claim 10 wherein said voltage level is selected to cause said reset MOS transistor to act as a weak source of minority carriers.

14. The method of claim 10 wherein said voltage level is selected to last for a period of time determined by comparing the pixel signal on a leg of the row select transistor to a dark signal reference voltage.

15. The method of claim 7 wherein the step of canceling said reset noise includes the step of comparing a pixel signal on a leg of the row select transistor to a dark signal reference voltage.

16. The method of claim 7 wherein minority carriers are used to cancel said reset noise.

17. The method of claim 16 wherein the offset nulling minority carriers are either holes or electrons.

18. An imager pixel comprising:

a first transistor means for functioning as the driver of a source follower amplifier during signal readout;

second transistor means for controlling signal readout; and third transistor means for serving as a reset switch during a first time interval and as a weak current source during a second time interval.

19. An apparatus comprising a plurality of the pixels of claim 18 and further comprising on-chip digital logic means for reading the signal from each pixel, multiplexing the signal outputs from an array of pixels, and enabling completion of a feedback loop for controlling the length of said second time interval.

20. The apparatus of claim 19 wherein said multiplexing is performed by horizontal and vertical shift registers.

21. An apparatus comprising a plurality of the pixels of claim 18 and further comprising column buffer means for providing an independent feedback loop to cancel each pixel's reset noise by biasing the third transistor means to act as a current source and thereby provide the necessary number of minority carriers to cancel the reset noise.

22. The apparatus of claim 4 wherein said photodetector comprises a p on n photodiode junction in an n-type substrate.

23. An apparatus comprising:

a pixel comprising:

(a) a photodetector element having a node;

(b) a first transistor having a control leg connected to said node and second and third legs, the third leg being connected to a power supply voltage;

(c) a second transistor having a control leg and fourth and fifth legs, the fourth leg connected to the second leg of said first transistor;

(d) a third transistor having a control leg and sixth and seventh legs, the seventh leg being connected to a reset voltage source; and means for supplying a reset voltage waveform to the control leg of said third transistor to reset said photodetector, said reset voltage waveform comprising a ground voltage level followed by a first reset voltage pulse for resetting the photodetector followed by an offset cancellation voltage pulse of a duration selected to cancel reset noise generated by resetting said photodetector.

24. The apparatus of claim 23 wherein said means for supplying further comprises:

comparator circuit connected to compare the voltage on the fifth leg of said second transistor to a dark signal reference voltage.

25. The apparatus of claim 24 wherein each of said first, second and third transistors comprises a MOSFET.

* * * * *

UNITED STATES PATENT AND TRADEMARK OFFICE
CERTIFICATE OF CORRECTION

PATENT NO. : 6,535,247 B1  Page 1 of 1
DATED : March 18, 2003
INVENTOR(S) : Kozlowski et al.

It is certified that error appears in the above-identified patent and that said Letters Patent is hereby corrected as shown below:

Column 12,
Line 30, before "capacitor", insert -- a --.

Signed and Sealed this

Thirteenth Day of May, 2003

JAMES E. ROGAN
*Director of the United States Patent and Trademark Office*